United States Patent [19]
Mori et al.

[11] Patent Number: 5,715,452
[45] Date of Patent: Feb. 3, 1998

[54] PROCESS OF TRANSFERRING FILE, PROCESS OF GAINING ACCESS TO DATA AND PROCESS OF WRITING DATA

[75] Inventors: Toshiaki Mori, Hachiouji; Toyohiko Kagimasa, Sagamihara; Kikuo Takahashi, Hachiouji; Toshiyuki Ukai, Sagamihara, all of Japan

[73] Assignee: Hitachi, Ltd., Tokyo, Japan

[21] Appl. No.: 357,192

[22] Filed: Dec. 13, 1994

[30] Foreign Application Priority Data

Dec. 27, 1993 [JP] Japan ................................. 5-330513

[51] Int. Cl.[6] ...................................... G06F 17/30
[52] U.S. Cl. ........................... 395/617; 395/601; 395/621
[58] Field of Search ......................... 395/275, 600, 395/425, 575, 441, 601, 621, 617, 491; 340/172.5; 364/200, 900

[56] References Cited

U.S. PATENT DOCUMENTS

| | | | |
|---|---|---|---|
| 3,987,419 | 10/1976 | Morrill et al. | 340/172.5 |
| 4,403,300 | 9/1983 | Bavoux et al. | 364/900 |
| 4,476,526 | 10/1984 | Dodd | 325/346 |
| 4,604,687 | 8/1986 | Abbott | 364/200 |
| 4,811,280 | 3/1989 | Berkowitz et al. | 364/900 |
| 4,972,364 | 11/1990 | Barrett et al. | 364/900 |
| 5,218,695 | 6/1993 | Noveck et al. | 395/600 |
| 5,276,830 | 1/1994 | Endo et al. | 395/425 |
| 5,276,840 | 1/1994 | Yu | 395/425 |
| 5,293,599 | 3/1994 | Kagimasa | 395/486 |
| 5,305,295 | 4/1994 | Chu | 369/30 |
| 5,313,585 | 5/1994 | Jeffries et al. | 395/275 |
| 5,321,832 | 6/1994 | Tanaka et al. | 395/600 |
| 5,335,334 | 8/1994 | Takahashi et al. | 395/491 |
| 5,355,475 | 10/1994 | Tanak et al. | 395/621 |
| 5,511,177 | 4/1996 | Kagimasa et al. | 395/441 |

OTHER PUBLICATIONS

Deitel, H.M. "Operating Systems" 2nd Ed. 1990 pp. 361–405.

"Chapter 8: The Design and Implementation of the 4.3BSD UNIX Operating System", items 242–245, published by Addison–Wesley Publishing Company, 1988.

"Chapter 5: Forms of Expressing Protocol and Data in Network", pp. 160–171, UNIX Workstation 1 <Basic Technique>, published by ASCII Company, 1987.

*Primary Examiner*—Thomas G. Black
*Assistant Examiner*—Charles L. Rones
*Attorney, Agent, or Firm*—Fay, Sharpe, Beall, Fagan, Minnich & McKee

[57] ABSTRACT

To transfer a file comprising block data at high speed between sequential access type auxiliary memories, a file transmission program inquires of an operating system about the physical storage positions of the block data, determines a reading order to reduce the read access time on the basis of the results of inquiry, and issues read requests sequentially to the operating system according to the reading order. The file transmission program requests the operating system to transmit the read block data. The block data together with respective logical identification data, for example, logical block numbers, are transmitted to a receiving end which may be another computing system. The operating system at the receiving end is requested to secure the number of physical data blocks required to store the block data. The write order of the block data to the physical data blocks is then determined to reduce the access time and the block data are respectively stored in the secured physical data blocks according to the write order. Sequentially, a pair of the logical identifiers of each block data actually written to the data area and physical identification data of the data blocks are stored in the data area.

26 Claims, 11 Drawing Sheets

ID,452

PROCESS OF TRANSFERRING FILE, PROCESS OF GAINING ACCESS TO DATA AND PROCESS OF WRITING DATA

BACKGROUND OF THE INVENTION

The present invention relates to a method of transferring a file between auxiliary storage of, e.g. respective computing systems and more particularly to a method of transferring a file of a plurality of block data.

Sequential access type memories such as disk units are usually employed as auxiliary memories in computing systems. In the memory of such a type, access time at the time data is read therefrom or written thereto is slow. In other words, a seek latency time of the read head of the disk unit (i.e., waiting time for the disk and head to relatively move axially and/or radially) and/or the rotational delay time of a disk medium occurs. In order to reduce the access time effectively, there have been proposed various methods of rearranging the order of issuing requests for reading a plurality of data in consideration of the seek time or the rotational delay time so as to reduce the time required to read the data specified by the plurality of requests.

A method of the sort proposed by Japanese Patent Laid-Open No. 362585/1992 is intended to increase speed at reading a plurality of data constituting the file requested by a host memory. More specifically, a storage position and a read head position in a disk unit are taken into consideration to vary the order of reading these data to decrease the time required to move the head. These data are then read in the order thus changed and written to a memory accessible by the host memory in the order in which these data had been written to the disk unit.

Japanese Patent Laid-Open No. 122712/1991 intends to increase speed at creating backup copies of file data on tape in a single computer system. That is, the time required for a read head of a disk storage to move is taken into consideration to vary the order of reading a plurality of block data for constituting a backup file.

In order to increase speed at reading data from a disk unit accessible by a plurality of user programs in parallel, on OS routine DISKSORT uses the storage positions of data designated by a plurality of file read requests issued from these user programs to rearrange the order of the file requests in a queue for reading the data. This method has been mentioned in, for example, "The Design and Implementation of the 4.3BSD UNIX Operating System", items 244–245, published by Addison-Wesley Publishing Company in 1988. Each user program sequentially issues a plurality of I/O requests for reading a plurality of block data constituting a file to be read. The plurality of I/O requests issued from the plurality of user programs in parallel are placed in a queue and the I/O requests in the queue are rearranged in the order in which the block data designated by the I/O requests have been stored. Consequently, reading the plurality of block data requested by these user programs is accelerated and this is also the case with write requests for writing block data.

An operating system in a parallel user computing system generally restricts the number of I/O requests issuable continuously from each user program to one or two, so that one user program may not monopolize an I/O unit. Therefore, any user program is allowed to output one or two I/O requests at a time when it reads file data from the I/O unit.

When a file is transferred between computing systems under the control of an operating system via a network, use is normally made of a method referred to in "Chapter 5: Forms of Expressing Protocol and Data in Network", pp 160–171, UNIX Workstation I <Basic Technique>, published by ASCII Company in 1987. A computing system at the transmitting end reads block data from the disk unit in the order of their offsets from the lead of a file and sequentially transfers the block data to a computing system at the receiving end. In other words, the file transmission program operated in the computing system at the file transmitting end sequentially issues requests for reading the plurality of block data for the file to be transmitted and reads in the block data to a communication buffering area in that program. Then the block data are transmitted to the file reception program operated in the computing system at the file receiving end, whereby the latter program writes the received block data to a communication buffering area in that program and to the disk unit in the computing system at the receiving end. The transfer operation is performed sequentially for the plurality of block data.

When a file is transferred between computing systems, the operation of reading or writing each of the block data constituting the file has conventionally been performed like reading the block data from the main memory or writing the block data from the main memory to the disk unit.

SUMMARY OF THE INVENTION

It is an object of the present invention to analyze problems in the prior art and provide solutions.

It is often the case in a single computing system that only some data out of the plurality of block data in the file are read from the auxiliary memory to the main memory or written from the latter to the former. In the case of file transfer between computing systems, however, all the block data constituting the file is transferred and consequently data is transferred in great quantities. Further, the file transfer between the computing systems is accompanied with two operations; namely, the operation of reading a file at the transmitting end and the operation of writing the file at the receiving end. Therefore, the file transfer operation takes a longer time than a case where some of the block data in the file are transferred from the main memory to the auxiliary memory and vice versa.

Further, the method of Japanese Patent Laid-Open No. 362585 is intended to read block data in the file requested by one user program from the auxiliary memory to the main memory of a single computing system. When an attempt is made to apply this method to the transfer between computing systems with control in one operating system, the auxiliary memory is monopolized for hours while the file data is read. Consequently, I/O requests from other user programs are compelled to wait for processing to be implemented, when other user programs are allowed to make I/O requests in parallel.

With respect to Japanese Patent Laid-Open No. 122712/1991, the disclosed technique is effective to increase the speed of creating a backup of one file. However, the problem is that the auxiliary memory is monopolized during the time the backup of the file is created.

An object of the present invention is to transfer a file between auxiliary memories in different computing systems at high speed.

An object of the present invention is to gain access to data in a file at high speed without letting a specific user program monopolize an auxiliary memory, in a computing system for processing I/O requests in parallel, which requests are output from a plurality of programs.

As the group of block data are written in the order in which they were transferred, the block data are written to the auxiliary memory in the computing system at the file receiving end in a short time. Although the writing operation is in a different order from the logical order of the block data, logical identification data of each block data and its physical location are stored, and consequently the block data can be read by designating the logical identification data of the block data as usual after the block data are written in this way.

The transfer speed is increased, when the group of block data (requested to be transferred by the file transfer program which runs in the computing system at the file receiving end) are transferred from the auxiliary memory in the transmitting computing system to the receiving computing system under the control of respective operating systems in the computing systems.

BRIEF DESCRIPTION OF THE DRAWINGS

Further objects, features and advantages of the present invention will become more clear from the following detailed description of a preferred embodiment, described with respect to the accompanying drawing.

DETAILED DESCRIPTION OF A PREFERRED EMBODIMENT

Figure 1:
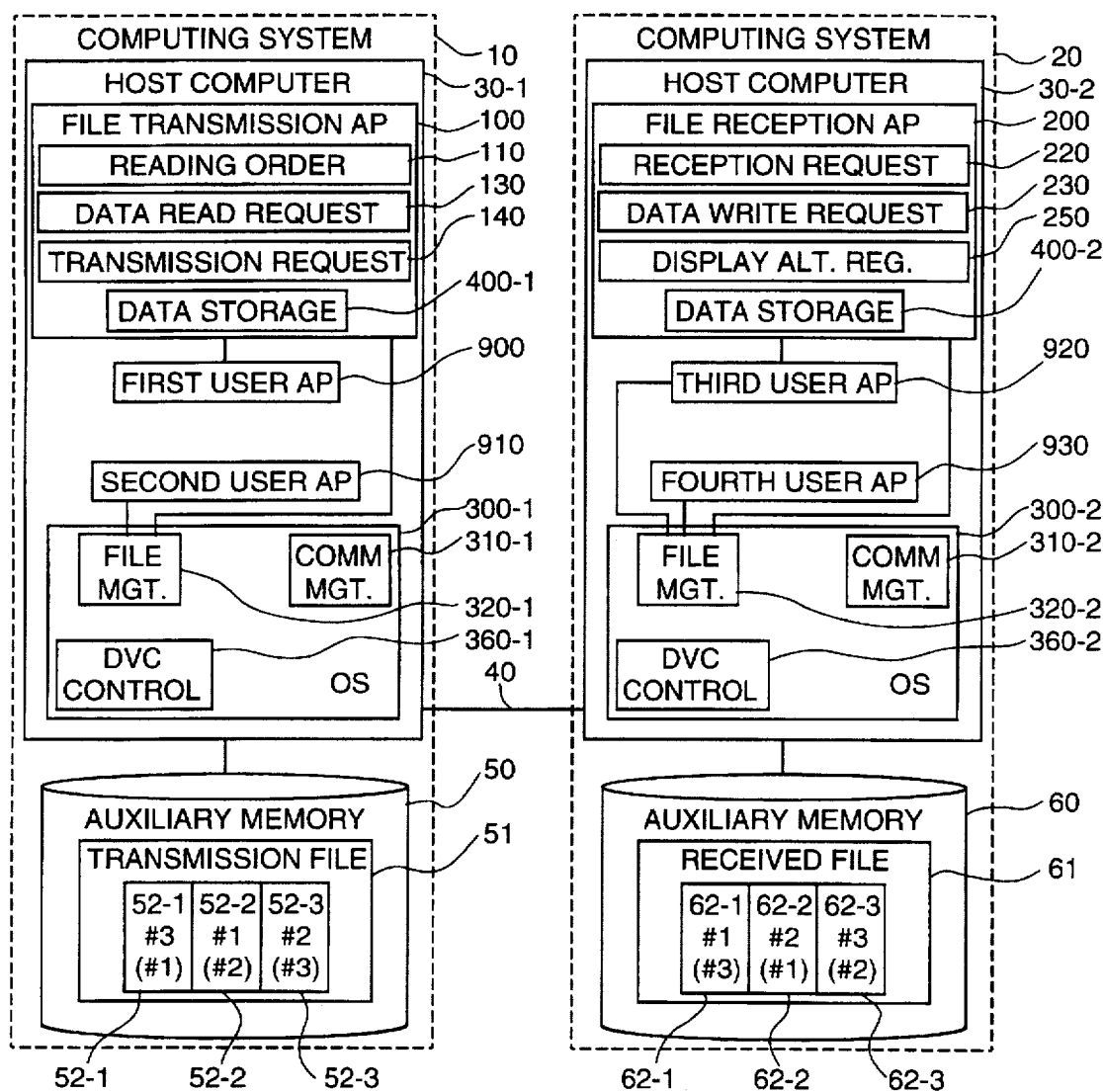
FIG. 1 is an overall block diagram of file transfer embodying the present invention.
Figure 2:
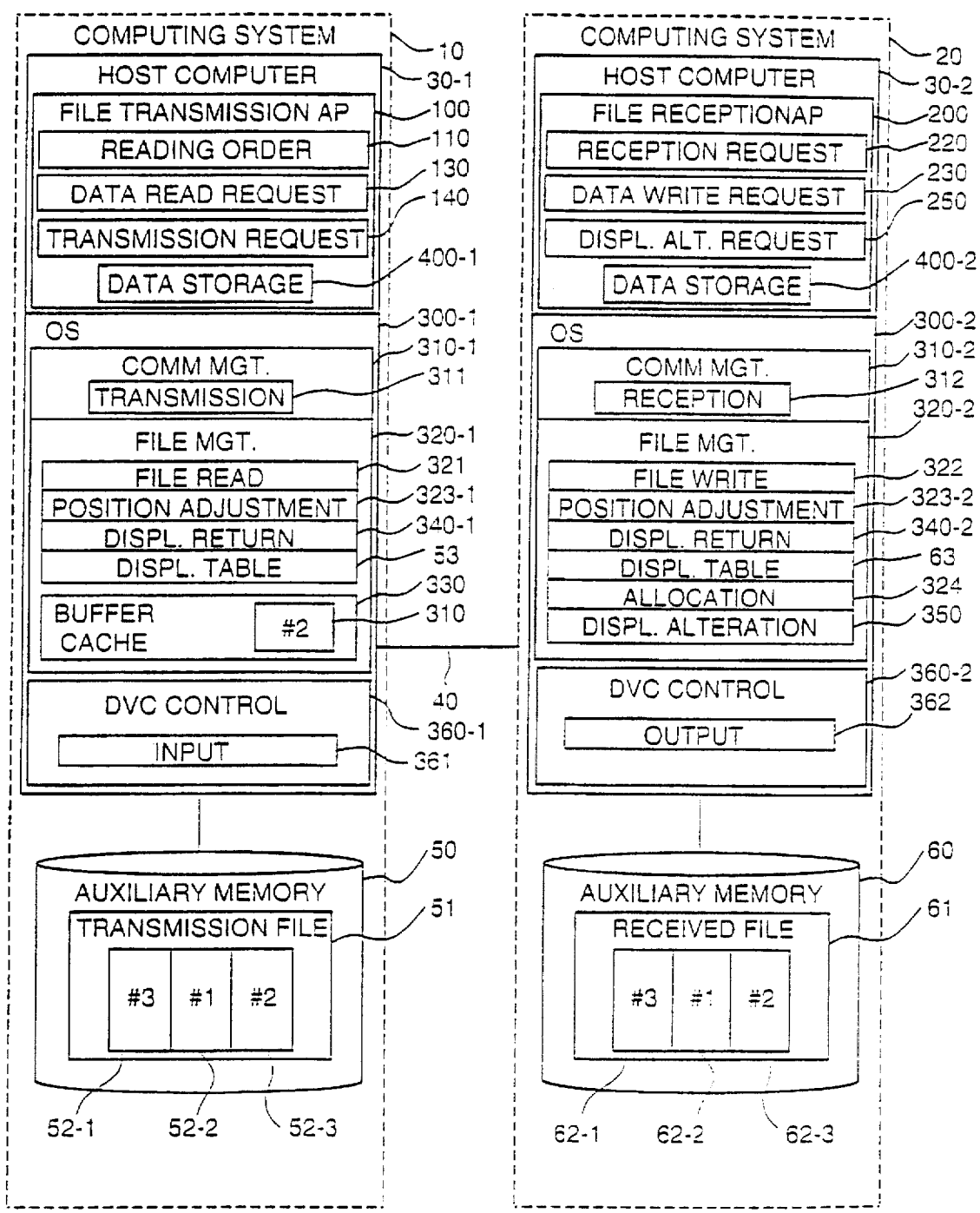
FIG. 2 is a block diagram of the file transfer of FIG. 1 in detail.

FIG. 1 illustrates systems and programs for implementing a file transfer according to the present invention.

A computing system 10 at the file-transmitting end or system and a computing system 20 at the file-receiving end or system, respectively comprise: a host computer 30-1 (hereinafter simply called the "host") and an auxiliary memory 50, and a host 30-2 and an auxiliary memory 60. The host 30-1 and the host 30-2 are connected together by a network 40. Although each of the hosts 30-1, 30-2 is provided with a main memory for storing programs and data, a command processor for executing the programs and an I/O processor for controlling inputs and outputs, their specific illustration is omitted for the sake of simplification.

The auxiliary memory 50 is equipped with a plurality of files including a transmission file 51 to be transferred. Like other files, the transmission file 51 contains a plurality of fixed-length block data. From the viewpoint of a program, each file appears to have data blocks that have been arranged in logical order. In other words, each block data can be designated by the program using the logical block number determined by the logical order or the logical offset value ranging from the logical leading position of the file up to the logical block number. The data block logical order determined by the logical block number and the logical order determined by the logical offset of each block may hereinafter be called the logical block order or file offset order. In the present embodiment of the invention, the logical block order and the file offset order have the same meaning unless otherwise specified.

Each block data is stored in one of the fixed-length data blocks or areas within the auxiliary memory 50. More specifically, a disk unit forming the auxiliary memory has a plurality of disks and each disk has a plurality of tracks. Further, each track has a plurality of fixed-length data blocks or areas. These data areas are distinguishable by specific numbers given according to their respective positions. These data areas are called physical data blocks and their locations are identified by physical block numbers.

The physical block numbers have been determined so that access time is minimized when the physical data blocks are accessed in numerical order. The plurality of data blocks are selected independently of their logical order. In FIG. 1, three logically consecutive block data (52-1), (52-2), (52-3) are shown stored in physical data blocks 52-1, 52-2, 52-3, having physical data block numbers #3, #1, #2 and logical block numbers (#1), (#2), (#3), respectively.

A received file 61 within the auxiliary memory 60 in a file receiving system 20 is exactly similar in structure to the transmission file 51 in auxiliary memory 50. Data (62-1), (62-2), (62-3) in the transferred file are stored in a received file 61 as logical block data (62-1), (62-2), (62-3) having logical data block numbers (#1), (#2), (#3) in physical data blocks 62-1, 62-2, 62-3, respectively having physical data block numbers #3, #1, #2.

Operating systems "OS" 300-1, 300-2 operate in the respective hosts 30-1, 30-2 to run a plurality of user application programs (AP) and file transfer programs.

For example, a file transmission program 100, a first user application program (AP) 900 and a second user application program 910 run on the OS of the file transmission system 10. Although the file transmission program 100 is an application program (AP) when viewed from OS 300-1, the file transmission program 100 is distinctively called to be started by any other user application program. However, a specific file transmission program 100 is not always essential and any one of the user application programs may directly request the OS to transfer the file. It is only needed for the user application program to have the same function as the file transmission program 100. This also applies to a file reception program 200 in the file reception system 20.

The file reception program 200, a third user application program 920 and a fourth user application program 930 run on the file reception system 20. The same program as the file reception program 200 also exists on the file transmission system 10 and that program together with the file transmission program 100 constitute a file transfer program for each of the computing systems 10 and 20. Such a file reception program in the file transmission system 10 will not be shown for the sake of simplification. Although the file transmission program 100 exists in the file reception system 20, it, likewise, will not be shown for the sake of simplification.

In response to a file transmission request from the first user application program 900, the file transmission program 100 requests the OS 300-1 to read the block data in the file designated by that request. When the block data is read from the auxiliary memory 50, the file transmission program 100 requests the OS 300-1 to transfer the read block data to another computing system, e.g. computing system 20, as designated by that request. When the second user application program 910 also makes a parallel request for file transmission, a similar file transmission program is used in parallel.

When the file transmission program 100 requests the OS 300-1 to read the plurality of block data in the transmission file, it inquires of the OS 300-1 about the physical storage positions of the block data in the auxiliary memory 50 and determines the read order of the block data to be read in such a manner as to reduce the time required to read the block data on the basis of the response of the OS 300-1 to the inquiry.

When a plurality of data blocks constituting a transmission file are transferred to the other computing system 20 over network 40, the file reception program 200 requests the OS 300-2 to receive these data blocks and when the data blocks are received, requests the OS 300-2 to write the data blocks to auxiliary memory 60.

The file reception program 200 requests the OS 300-2 to secure a group of data blocks to which the plurality of received block data are to be written so as to reduce the time required to write the plurality of received block data to the auxiliary memory 60; the file transmission program 100 determines the order of read access to the physical data blocks 52-1, 52-2, 52-3, and the file reception program 200 writes the plurality of block data thus accessed and transferred to the physical data blocks 62-1, 62-2, 62-3 in the order of read access, to reduce the write access time for the group of block data.

The OS 300-1 and OS 300-2 as shown in FIG. 1, have file management units (FILE MGT) 320-1, 320-2, communication management units (COMM MGT) 310-1, 310-2, and device control units (DVC CONTROL) 360-1, 360-2.

When the same program portions or units (e.g., the file management units 320-1, 320-2) in the file transmission system 10 and the file reception system 20 are described, the generic term of the program (e.g., the file management unit 320) will be used hereinafter.

The OS 300 has a multiprogram execution function capable of parallel executing the user application programs 900, 910, 920, 930, the file transmission program 100 and the file reception program 200.

The file management unit 320 selects a file transfer request to be executed from among read/write requests issued from host programs such as the file transmission program 100, the file reception program 200, or the user application programs 900, 910, 920, 930, and then the file management unit 320 instructs the device control unit 360 to execute the selected request. The device control unit 360 executes the reading/writing of data from or to the auxiliary memories 50, 60 according to the read/write request selected by the file management unit 320. The communication management unit 310 transfers the read data via the network 40 on receiving the file transfer request from the file transmission program 100.

More specifically, the file management unit 320 performs a series of processes, including: preparing up to a maximum of two block data read/write requests in file offset order out of the requested files, on receiving the file read/write requests, and control information as to the requested files and the size of file read/write requests; conveying the block data read/write requests to the device control unit 360; waiting for a response from the device control unit 360; reading/writing the data of the size requested by the host programs from or to the physical data blocks while repeating new block data read/write requests; and then conveying the termination of the processing to the host programs when the requested file is obtained. The file management unit 320 restricts the block data read/write requests to a maximum of two data blocks to prevent one program from monopolizing the device control unit.

In the file read process 321, a maximum of two physical block data read requests are issued at a time to the device control unit 360 in logical file offset order, with respect to one file read request from one program, even though the file read request for reading the file 51 covers the plurality of block data (52-1), (52-2), (52-3). The next block data read request is issued after waiting for a response of the device control unit 360 to the first two block data read requests. In the file write process 322, a maximum of two block data write requests are issued at each of a plurality of times to the device control unit 360 even though a file write request for writing to the file 61 covers the plurality of block data (62-1), (62-2), (62-3). This maximum limitation of the block data read/write requests is to prevent one program from monopolizing the I/O unit. The file read request and the file write request from the file transmission program 100 and the file reception program 200 are made once unless the physical block data continues.

Further, the file management unit 320 includes: a file position adjustment process 323 for changing the file offsets of the files 51, 61 to be read and written; file displacement control tables 53, 63 for controlling the positions of the physical blocks on the auxiliary memory 50 or 60 of the block data and the file offsets of the data blocks 52-1–62-3; a file displacement return process 340 for obtaining the physical arrangement of the data blocks 52-1–62-3 storing the data constituting the files 51, 61; a block displacement alteration process 350 for rearranging the file offsets of the file displacement control tables 53, 63 into designated file offset trains; a file allocation process 324 for allocating the physical data blocks 62-1, 62-2, 62-3 to the file 61; and a buffer cache 330 for temporarily holding the block data (52), (62) in the hosts.

The device control unit 360 performs a physical block input/output process 361/362 for transferring the block data with respect to the auxiliary memories 50 and 60 according to the physical block data read/write request issued from the host file management unit 320. The device control unit 360 queues the plurality of logical block data read/write requests issued from the host file management unit 320, and rearranges them in physical block order in the queue up to the last I/O process, one after another with respect to the auxiliary memories 50, 60. A maximum of two physical block data read/write requests from one program are dealt with in the file management unit 320. In a case where a plurality of programs operating in parallel make file read/write requests simultaneously, the maximum number of physical block data read/write requests (2×the number of parallel execution programs) is placed in the queue.

However, one physical block data read/write request is queued for the device control unit 360 because reading/writing a file is carried out on a physical block data basis in one file transmission program 100 and one file reception program 200.

The physical block input and output processes 361, 362 report to the host file management unit 320 each time one physical block data read/write request is completed. The file management unit 320 issues a maximum of two block data read/write requests to one program and waits for the block data read/write requests to be completed.

The communication management unit 310 performs a transmission process 311 for transmitting the data that the file transmission program 100 has produced in a temporary communication data storage area 400-1 to the file reception computing system 20. A reception process 312 for receiving the communication data transmitted under the transmission process 311 temporarily stores the communication data in a communication data storage area 400-2 of the file reception program 200.

Figure 3A:
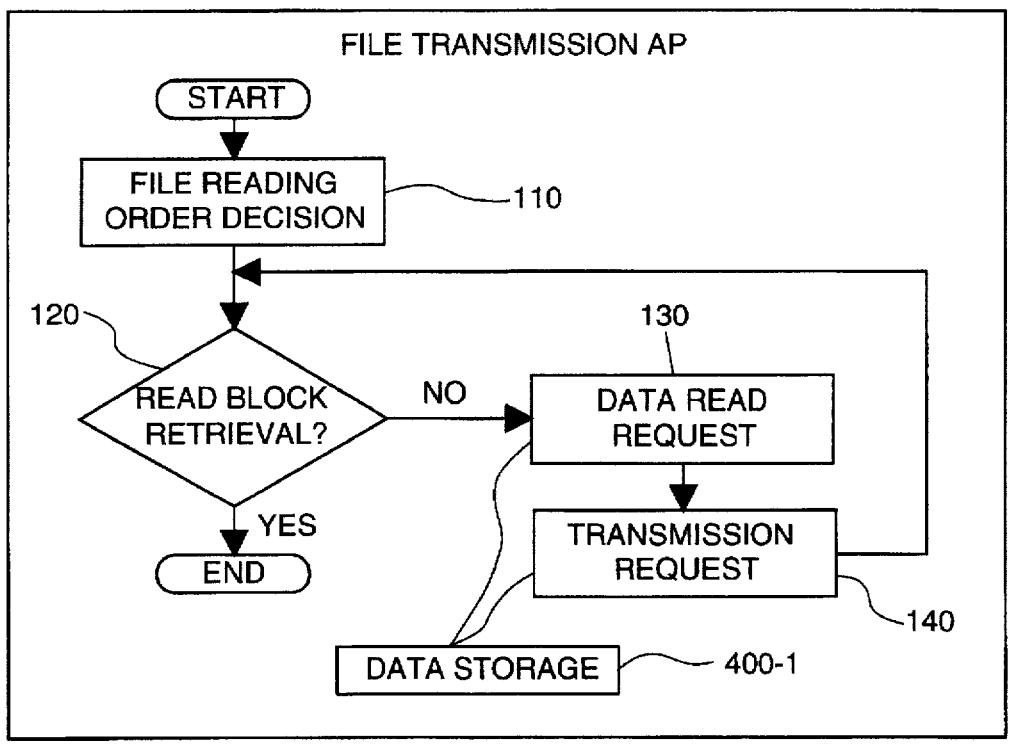
FIG. 3(a) is a flowchart of the file transmission program of FIG. 1.

In FIG. 3(a) the file transmission program 100 is started by the user application program 900, e.g. the file reading order decision process (110) determines the read order in which physical data blocks 52-1–52-3 are read. The file reading order decision process (110) determines the read order of block data by the physical positions of all the data blocks 52-1–52-3 storing the transmission file 51. The file reading order decision process (110), will be described in FIG. 4. The read block retrieval process (120) examines whether or not the block data constituting the transmission file 51 have completely been read from physical data blocks 52-1–52-3. When the block data have been read completely, the file transmission program 100 is terminated, and when not, the transmission data read request process (130) is called. The transmission data read request process (130) calls the file position adjustment process 323-1 for creating the block data in the order determined by the file reading order decision process (110) reads the block data on the auxiliary memory 50 into a communication block data group 420-1 in the communication data storage area 400-1 (shown in detail in FIG. 12), and creates a communication header 410-1. The transmission data read request process (130) will be described later by reference to FIG. 5. The transmission request process (140) requests the communication data transmission process 311 to transmit to the file reception computing system 20 the communication header 410-1 of the communication data storage area 400-1 and the communication block data group 420-1 of FIG. 12 created in the transmission data read request process (130), and returns to the read block retrieval process (120) to process the next read block.

Figure 3B:
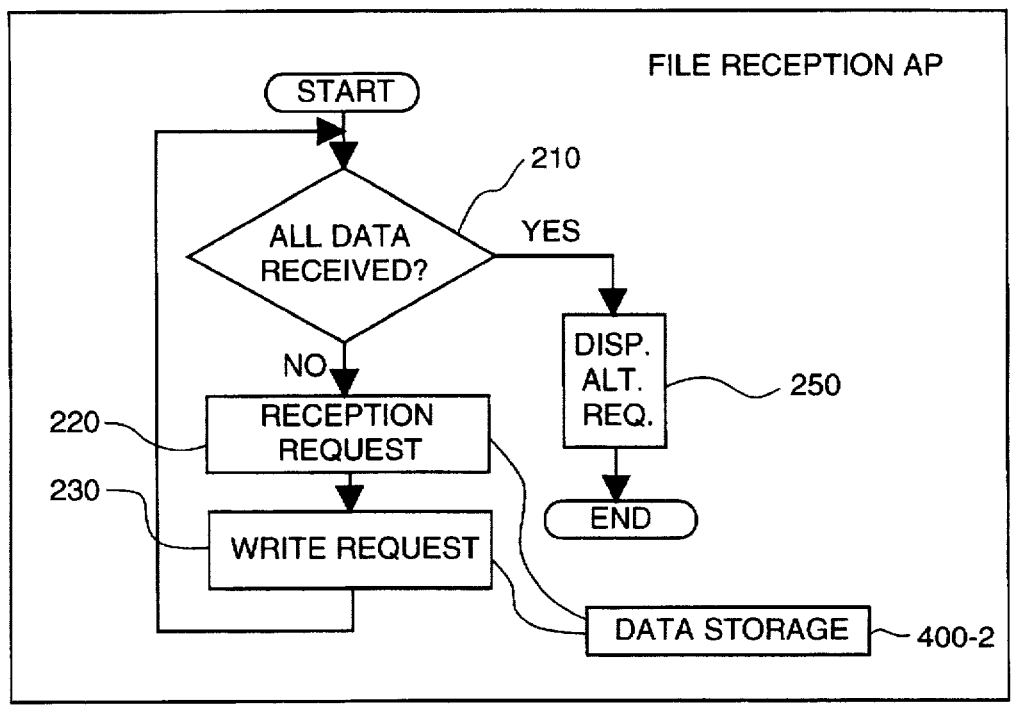
FIG. 3(b) is a flowchart of the file reception program of FIG. 1.

FIG. 3(b) shows the file reception program 200. The reception block retrieval process (210) examines whether or not all the block data transmitted from the transmission file 51 have been received. When all the block data have not been received yet, the reception block retrieval process 210 calls the reception request process (220), and when all the block data 52 have completely been received, calls the file displacement alteration request process (250). The reception request process (220) requests the communication data reception process 312 to receive the communication header 410-1 transmitted from the file transmission AP 100 and the communication block data group 420-1, and stores them on the communication data storage 400-2, shown in FIG. 12. While calling a file position adjustment process 323-2 to regulate the write block data, the reception data write request process (230) writes the communication block data group 420-2 in the read order from the communication data storage area 400-2 to the physical data blocks 62-1–62-3 of the reception file 61 in the order of physical block numbers using the file write process 322. The reception data write request process (230) rearranges the file displacement control table 63 (FIG. 10) of the reception file 61 that are in the write order of offsets of block data of the transmission file 51 after all the block data of the physical data blocks 62-1–62-3 of the reception file 61 have been written to the auxiliary memory 60. The process then returns to the reception block retrieval process (210) to process the next reception data.

The reception data write request process (230) will be described with reference to FIG. 6. The file displacement alteration request process (250) calls a block-order alteration process 350 to rearrange the block data (62-1)–(62-3) of the reception file 61 of the auxiliary memory 60 in file offset order in the transmitting computing system 10, alters the physical block data command unit in the file displacement control table 63 of the reception file 61, and terminates the execution of the file reception program 200. The reception data write request process (230) determines the write order of data blocks 62-1–62-3 to be written by the physical positions of the data blocks like the file reading order decision process (110) of the file transmission program 100; namely, in the order of physical block numbers #1, #2, #3.

Figure 12:
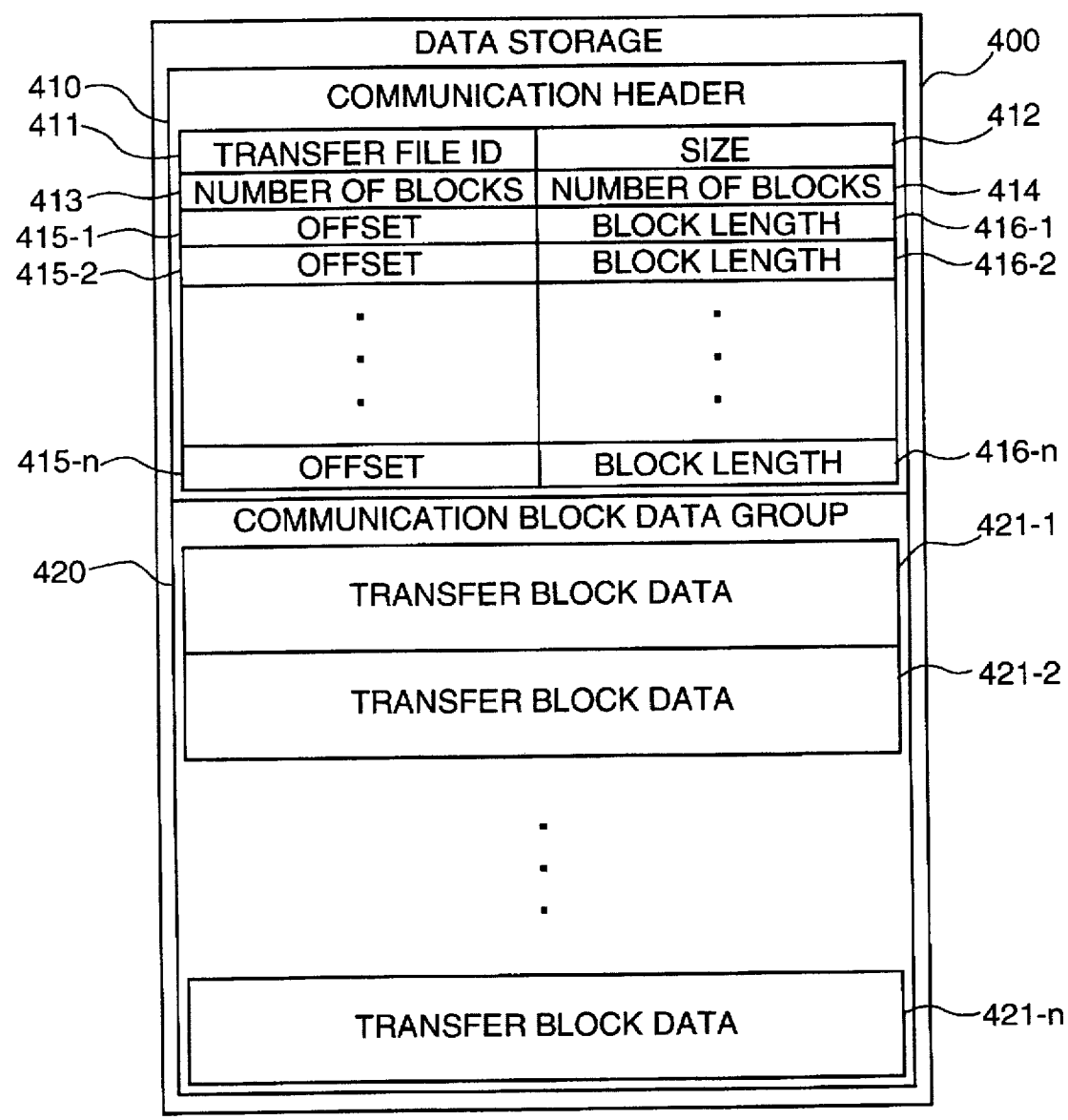
FIG. 12 is a block diagram of the structure of the data storage of FIGS. 3(a) and 3(b)
Figure 13A:
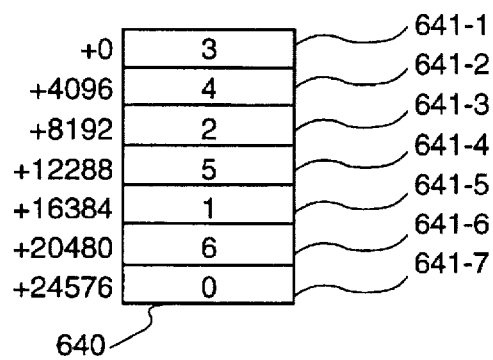
FIGS. 13(a) to 13(e) are diagrams illustrating the effects of the file read/write of the file transfer of FIG. 1.
Figure 13B:
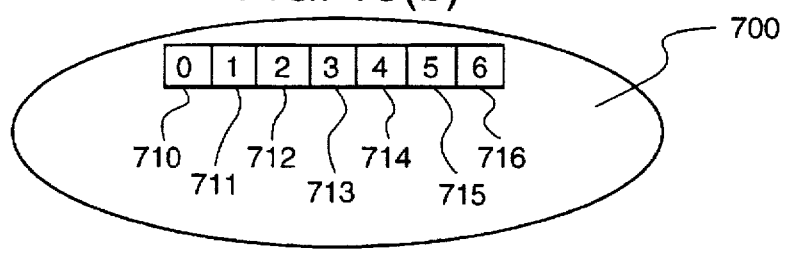
Figure 13C:
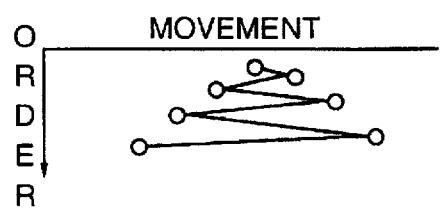
Figure 13D:
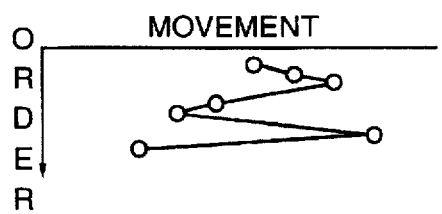
Figure 13E:
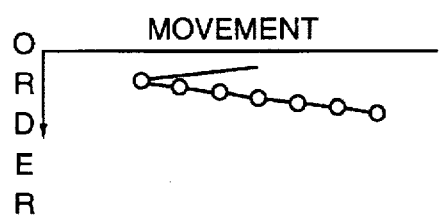

The communication header 410 of FIG. 12 comprises a transfer file identifier 411 identifying a transmission file 51 to be transferred, a transfer file size 412 indicating the size of the file to be transferred (e.g. in bytes), the number of transfer blocks 413 indicating the quantity of blocks to be transferred at a time (e.g. limited to two), the number of all transfer file blocks 414 indicating the quantity of all data blocks containing the file to be transferred (e.g. n), and a pair of transfer block offsets 415-1–415-n and transfer block lengths 416-1–416-n (the former indicating the offsets of first-to-last transfer block data 421-1–421-n respectively of the transmission file 51, and the latter indicating the sizes e.g. bytes, of the transfer block data 421-1–421-n, respectively). The transfer block offset 415-i, the transfer block length 416-i and the transfer block data 421-i correspond to one another by i (i=any integer ranging from 1 to n). The transfer block lengths 416-1–416-n become necessary only when the individual block data 421-1–421-n are different in length from one another. When the block data 421-1–421-N are constant in length, only one length 416 need be given. The capacity of the communication header 410 is reducible to reduce the overhead in communication by collecting the transfer block lengths 416-1–416-n into the one transfer block length 416 when using fixed size blocks. The size of the communication data storage area 400 is dependent on the capacity of the main memory possessed by the hosts 30-1, 30-2 and is restricted to the smaller of the memory areas secured by the file transmission program 100 and the file reception program 200.

The file transmission program 100 reads any given block data (52-i) to produce the transmission file 51. The reception file 61 is produced from the transfer block data 421-i in the file reception program 200 by adding the transfer block logical offset 415-i to the individual transfer block data 421-i.

The size of communication data can be varied by the number of transfer blocks 413 and the transfer block length 416, whereby the communication data storage area 400 is usable with efficiency. Since the plurality of block data (52-1)–(52-n) can be processed collectively in a system having a large capacity communication data storage area 400, not only the number of calls to the communication area transmission process 311 and the communication data reception process 312, but also communication process overheads, become reducible.

As the communication header 410 includes the transfer file size 412, in the file allocation process 324 of the file reception program 20, all the block data constituting the reception file 61 can be allocated with temporary logical identification data to the physical data block numbers #1–#3 (in the write order) prior to executing file write process 322 of the transfer block data 420-i and prior to completing the transfer.

In a description which will follow, the number of transfer blocks 413 is assumed to be one for the sake of simplification. Therefore, the transfer of the transmission file 51 needs the transfer of data three times since the number of blocks 414 is three. Moreover, the order of block data (52-1)–(52-3) to be transferred in the read order is assumed to be 52-3, 52-2, 52-1 in accordance with the physical positions.

Figure 4:
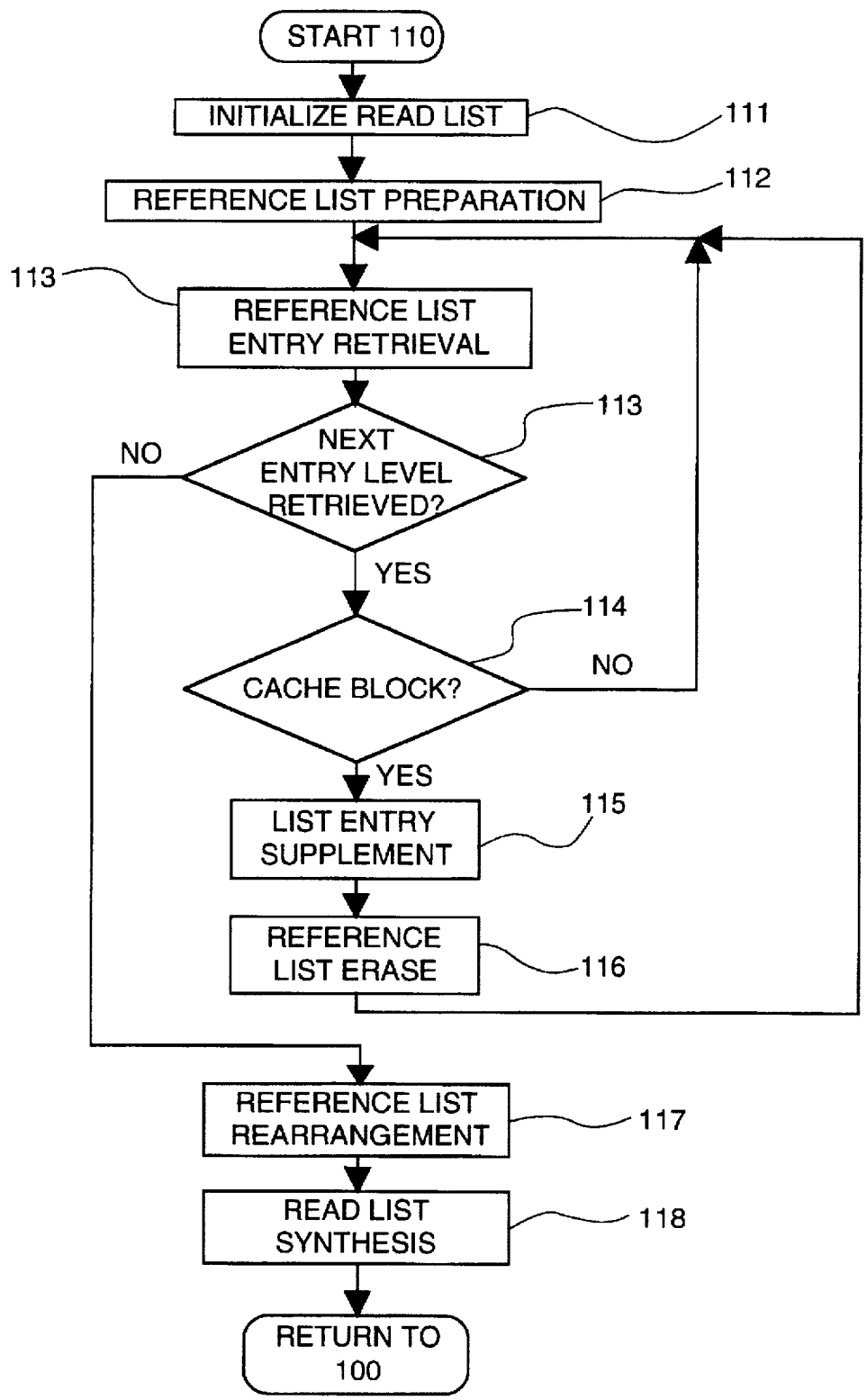
FIG. 4 is a flowchart of a file reading order decision process of FIG. 3(a)

In FIG. 4 the file reading order decision process 110 starts and the read list initialization process (111) evacuates the read list 500 indicating the order of the block data of data block 52-1–52-3 to be read, for initialization. The read list 500 comprises a read list pointer 501 and a plurality of read entries 502-1–502-3. The read list entry 502-i comprises a pointer 503-i indicating the next read list entry 502-(i+1), a physical data block number storage area 504-i indicating block data and a file offset storage area 505-i of the block data. A reference list 510 is similar in structure to the read list 500 and reference list entries 512i are arranged in the order of physical offsets in the file displacement control table 520 in contrast to the read list 500, in which list entries 502i are arranged in the logical order of the block data 52 to be read. More specifically, the read list initialization process (111) clears the read list pointer 501 to zero. The reference list preparation process (112) of FIG. 4 takes file offsets out of the physical block numbers 521 and a list of their physical blocks in the file displacement control table 520 to form the file reference list 510. The file displacement control table 520 includes the physical block number storage areas 521-1–521-3 of the block data (52-1)–(52-3) constituting the transmission file 51 and stores the physical block numbers #3, #1, #2 in the ascending order of file offsets. For example block data (52) is equal to a fixed length of 4096 bytes. When the size of the block data (52) is variable, a field for controlling the length of each block data is required for the file displacement control table 520.

The reference list entry retrieval process (113) takes out list entries 512-i ranging from the leading list entry 512-1 up to the last one 512-3 in the reference list 510 and calls the reference list rearrangement process (117) after retrieval of all the reference list entries 512. The cache block decision process (114) examines whether or not the block data (52) indicated by the reference entry 512-i exists in a buffer cache 330. When the block data (52) exists therein, the cache block decision process calls the list entry supplement process (115), and, when not, returns to Step 113 to check the next reference entry 512. The list entry supplement process (115) forms the read list entry 502 from the physical block number 514 of the reference list entry 512-i and the file offset 515, updates the read list pointer 501 and the list pointer 503 and adds the list entry 502. The reference list erase process (116) updates the list pointer 512-(i−1) or the reference list pointer 511 of the reference list entry 512-(i−1) of the reference list 510, erases the reference list entry 512-i, and returns to Step 113.

The reference list rearrangement process (117) rearranges the physical block numbers 514 in the reference list 510 in the ascending order. The read list synthesis process (118) reads all list entries 512 in the reference list 510, adds them to the read list 500 (at entries corresponding to the block number 514) in reference list entry order 511, and returns control to the file transmission program 100. The read list thus indicates the order of the block data (52-1)–(52-3) to be read for constituting the transmission file 51. The physical block numbers are rearranged in the ascending read order in the reference list rearrangement process (117) so that read access is made as short as possible.

Figure 5:
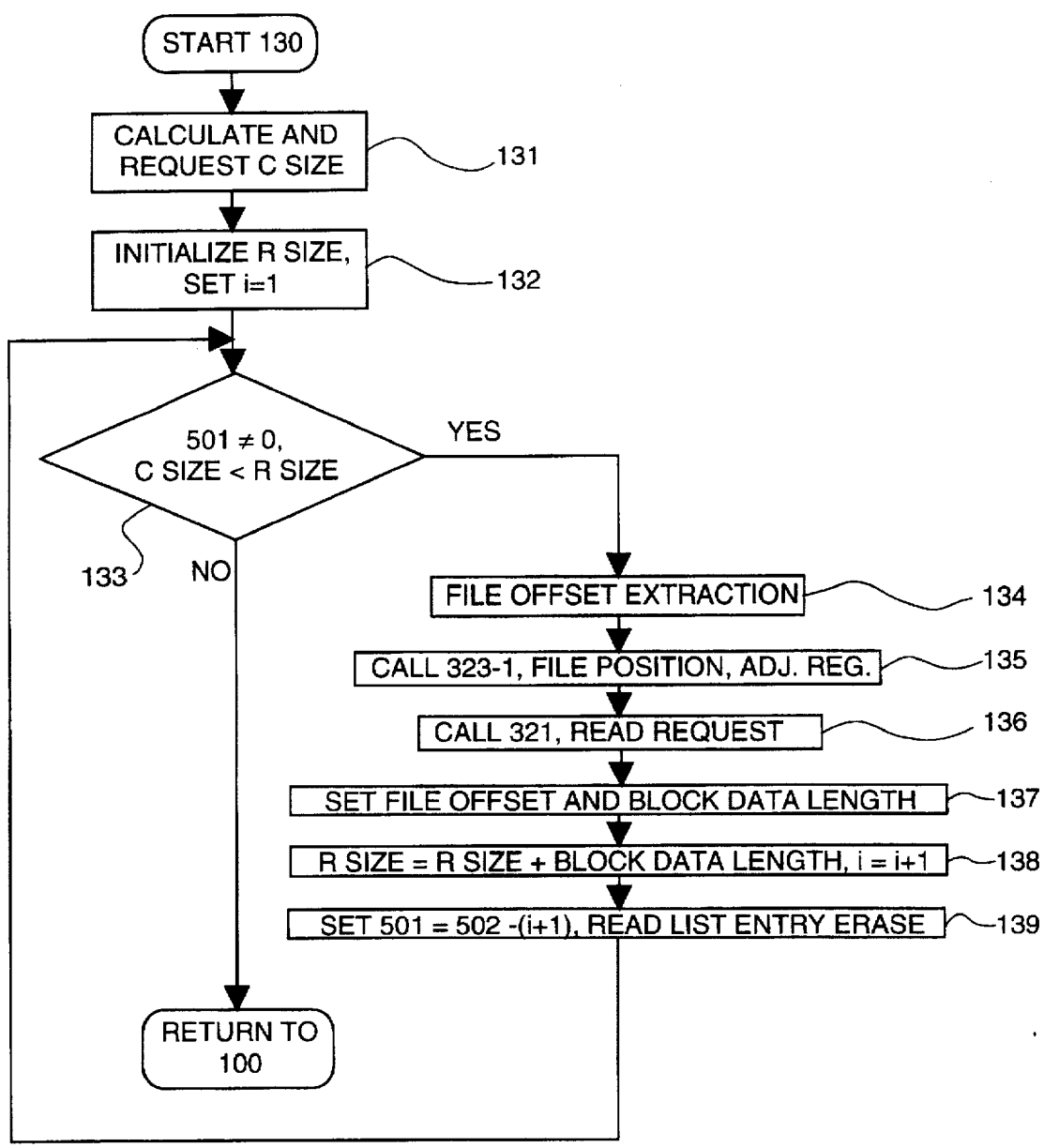
FIG. 5 is a flowchart of a transmission data read request process of FIG. 3(a)

Referring to FIG. 5, a detailed description will be given of the transmission data read request process (130). The communication buffer area calculation process (131) calculates a communication data storage area length, "CSIZE". The read data quantity initialization process (132) stores a variable for controlling the data quantity of the block data that has been read into the communication data storage area 400-1, initializes the read size "RSIZE" and sets a variable i=1 for controlling the transfer block. The read list entry retrieval process (133) transfers control to the file offset extraction process (134) when the read list pointer 501 of the read list 500 is not empty (0) and when CSIZE is smaller than RSIZE, and otherwise returns the control process to the file transmission program 100.

The file offset extraction process (134) takes out the block data number (#j) of the read list entry 502-j shown by the read list pointer 501. When CSIZE is extremely close to RSIZE and when a file offset is greatly shifted from the preceding file offset, the file offset extraction process (134) suspends the remaining process and returns the control process to the file transmission program 100 to prevent the file read time from increasing by a large margin.

The file position adjustment request process (135) calls the file position adjustment process 323-1 to change the read start position to the file offset of a block data (52-j). The file read request process (136) calls the file read process 321 and reads the block data (52-j) into the communication block data 421-i in the transfer block data group 420. The transfer file offset setting process (137) sets the file offset and block data length of the block data (52-j) to the transfer file offset 415-i and the transfer block length 416-i respectively.

The read data quantity calculation process (138) adds the block data length of the block data (52-j) to RSIZE and adds 1 to the variable i. The read list entry erase process (139) erases the read list entry 502-j from the read list 500 and returns to the read list entry retrieval process (133) to process the next read list entry 502-(j+1); namely, it sets an address indicating the next read list entry 502-(j+1) to the read list pointer 501.

A write list 600 and a read-complete list 610 for use in the reception data write request process (230), shown in detail in FIG. 6, will be described by reference to FIG. 8, and a file displacement control table 620 at the time the reception file 61 is allocated will be described by reference to FIG. 9.

Figure 6:
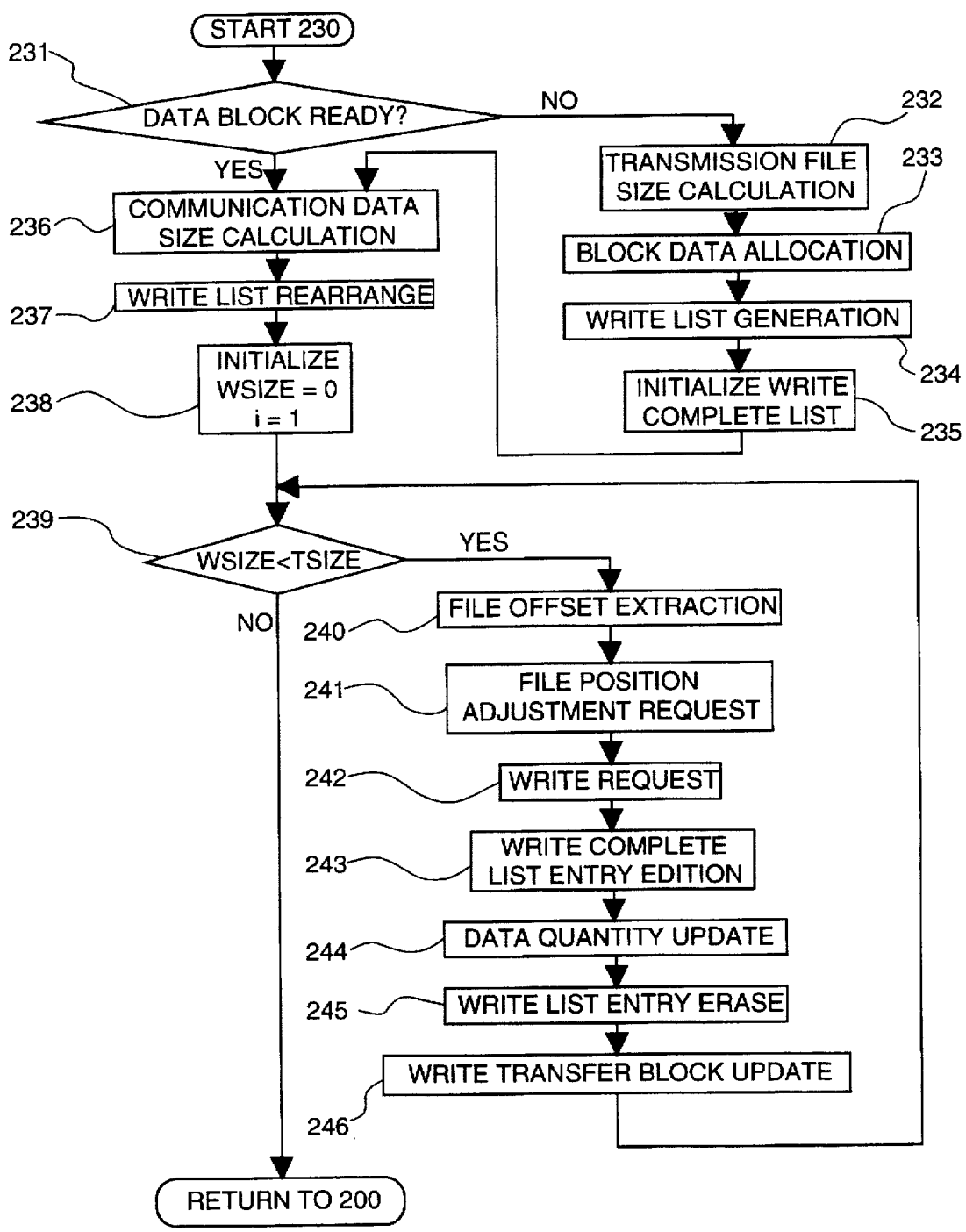
FIG. 6 is a flowchart of a reception data storage process of FIG. 3(b)
Figure 7:
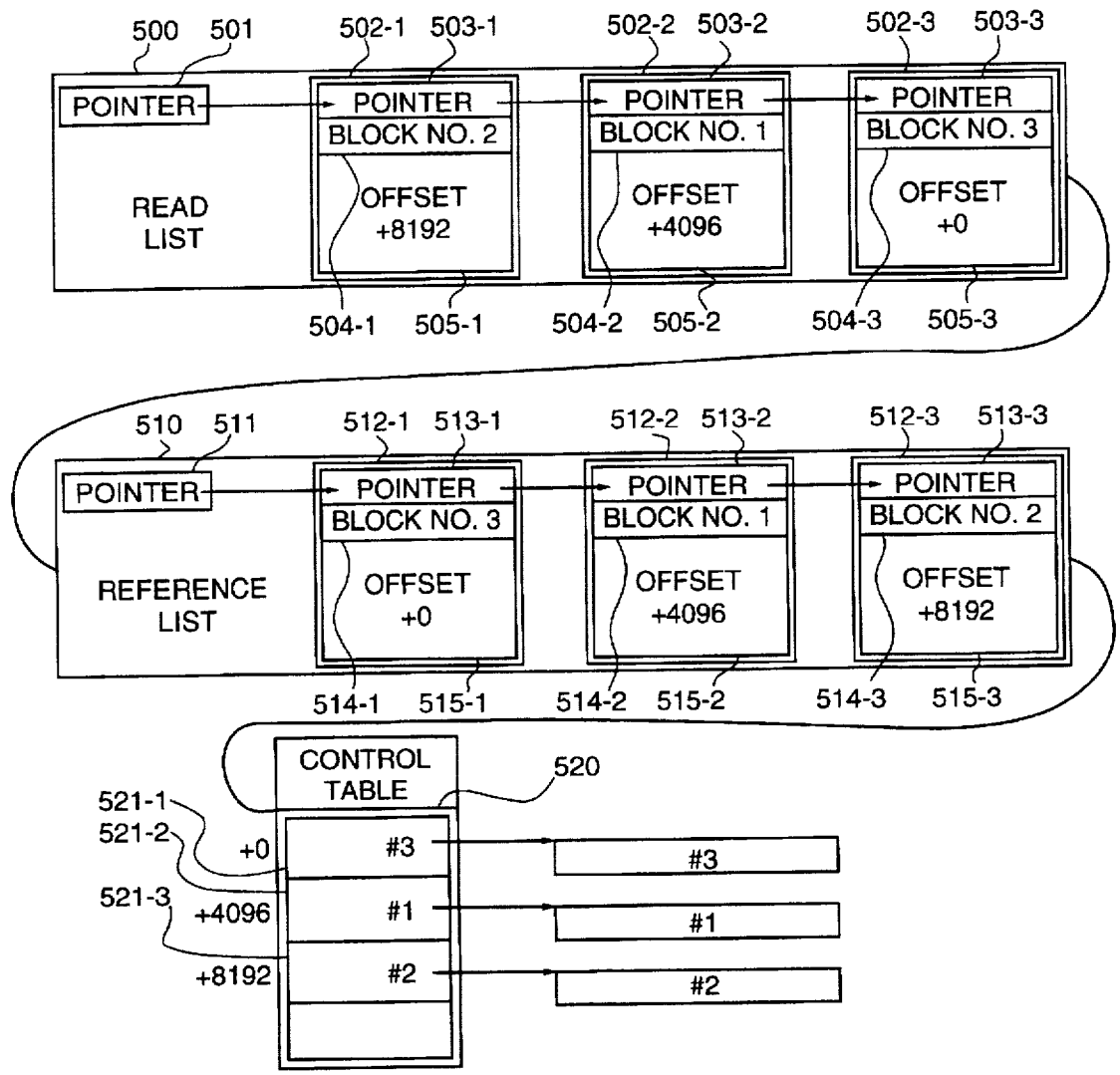
FIG. 7 is a block diagram of the control table of the file transmission program of FIG. 1.

The file verification process (231) of FIG. 6 examines whether or not a data block is ready for storing the transfer block data, calls the transmission file size calculation process (232) if it is not ready therefor, and calls the communication data size calculation process (236) if it is ready. The transfer file size calculation process (232) calculates the data capacity of the reception file 61 from the transfer file size 412 in the communication storage area 400-2. The block data collective allocation request process (233) requests the file allocation process 324 to allocate the reception file 61 and waits for the completion of the block data 62 of the reception file 61. The write list generation process (234)

allocates the block data (62-1)–(62-3) of the reception file 61 in view of the data capacity of the reception file calculated by step (232) and generates the file displacement control table 620.

Figure 9:
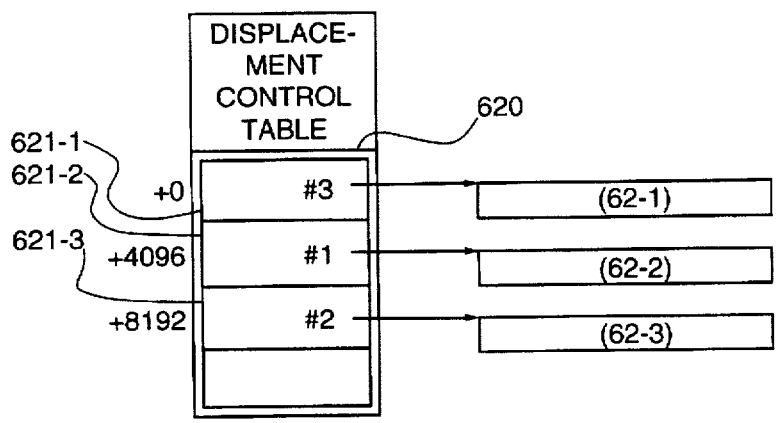
FIG. 9 is a block diagram of a file displacement control table at the time a write file is allocated in the process of FIG. 6.

FIG. 9 shows the file displacement control table 620 at the time the reception file 61 has been allocated, and includes physical block storage areas 621-1–621-3 of physical block numbers #1–#3 for storing the block data (62-1)–(62-3). The present embodiment of the invention refers to a case where one block is 4096 bytes in length. Although the physical blocks #1, #2, #3 are to be allocated to the block data (62-1)–(62-3) in the ascending order of file offsets, physical blocks are allocated at random.

The write list generation process (234) calls a block arrangement return process (322-2) and generates the write list from the file displacement control table 620. The write list 600 at this time is arranged in the file offset order shown by the file displacement control table 620 of FIG. 9. In the write list rearrangement process (237) which will be described later, however, the write list entry 602 is rearranged in the order in which it is written to the reception file 61 as shown in FIG. 8.

The write-complete list initialization process (235) initializes the write-complete list 610 while showing that the reception file has been secured. The file verification process (231) collectively allocates the physical blocks to the file and indicates that the physical blocks are not to be allocated each time communication is effected. The communication data size calculation process (236) calculates the size of the data (hereinafter called "TSIZE") transferred per communication from the number of transfer blocks 413 in the communication data storage area 400-2 and the transfer block length 416. Like the reference list rearrangement process (117) shown in FIG. 4, the write list rearrangement process (237) calculates the number of transfer blocks 413 per communication, generates combination lists for writing the transfer block data 421 having transfer blocks 413 from the write list 510, arranges the individual combination lists in the ascending order of distances in time, and rearranges the write list 600 in the order in which the write time is as short as possible.

The write data quantity initialization process (238) initializes to zero a write size WSIZE, the variable for controlling the data quantity at which the transfer block data 421-i in the communication storage area 400-2 is written to the block data (62-1)–(62-3) and sets the variable i for controlling the transfer block to 1. The communication block data retrieval process (239) performs the write file offset extraction process (240) when WSIZE is smaller than TSIZE in view of the list entry 602-j to which the write list pointer 601 of the write list 600 points, and, when WSIZE exceeds TSIZE, returns the control process to the file reception program 200.

The write file offset extraction process (240) takes out the block data number #j of the write list entry 602-j shown by the write list pointer 601. The file position adjustment request process (241) calls the file position adjustment process 323-2 and changes the start position at which the file offset of the block data (62-j) is written. The file write request process (242) calls the file write process 322 and writes the transfer block data 421-i in the transfer block group 420-2 to the block data (62-j).

The write-complete list entry addition request (243) generates the write-complete list entry 612 from the transfer file offset 415-i of the written transfer block data 421-i and the block data (62-j) of the write list entry 602-j, and adds the result to the write-complete list 610. The write data quantity updation process (244) adds the transfer block length 416-i to WSIZE. The write list entry erase process (245) erases the write list entry 602-j from the write list 600; that is, an address indicating the next write list entry 602-(j+1) is set to the write list pointer 601. The write transfer block update process (246) adds 1 to the variable i and returns to the communication block data retrieval process (239).

Figure 10:
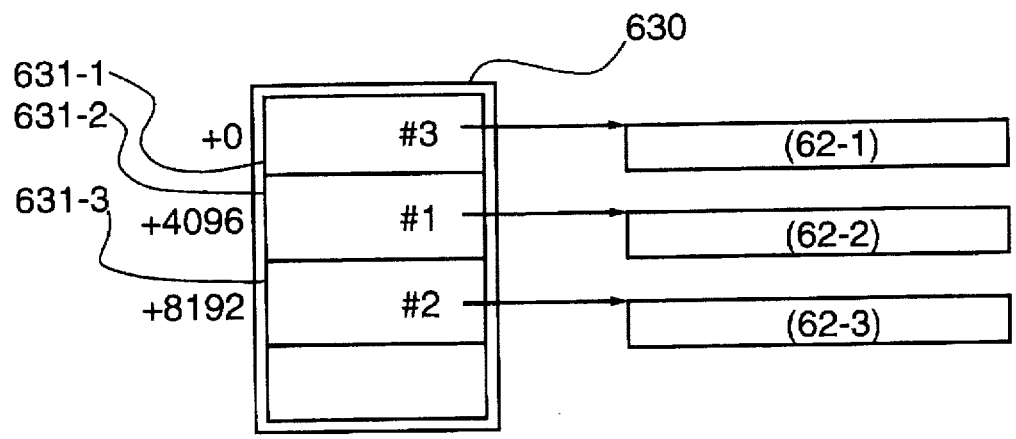
FIG. 10 is a block diagram of the file displacement control table at the time the write file is rearranged by the processing of FIG. 11.
Figure 11:
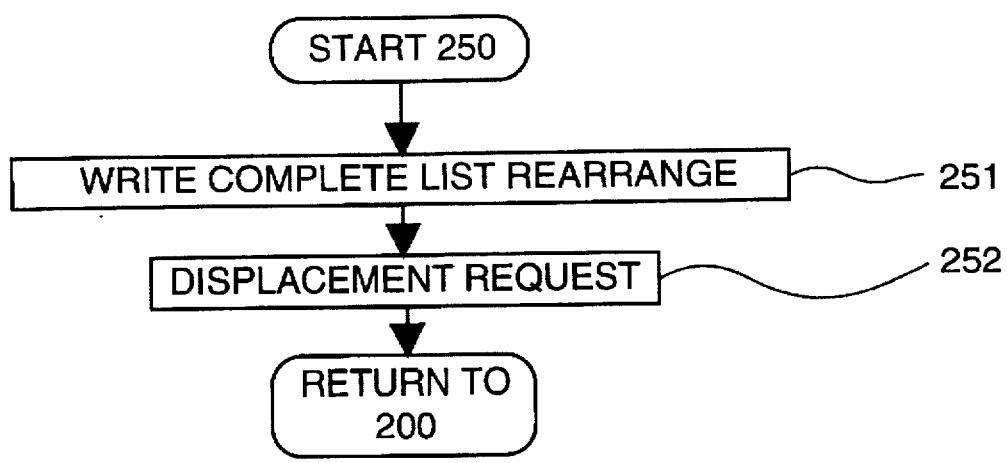
FIG. 11 is a flowchart of a file displacement alteration request process of FIG. 3(b)

Referring to FIG. 11, a detailed description will be given of a file displacement alteration request process (250) for rearranging the file displacement control table 620 of reception file 61 at the time of file allocation in the order of file offsets after the completion of the reception process. The write-complete list 610 utilized in the file displacement alteration request process (250) is shown in FIG. 8 and a file displacement control table 630 after the process of altering the arrangement of the reception file 61 will be described by reference to FIG. 10.

Figure 8:
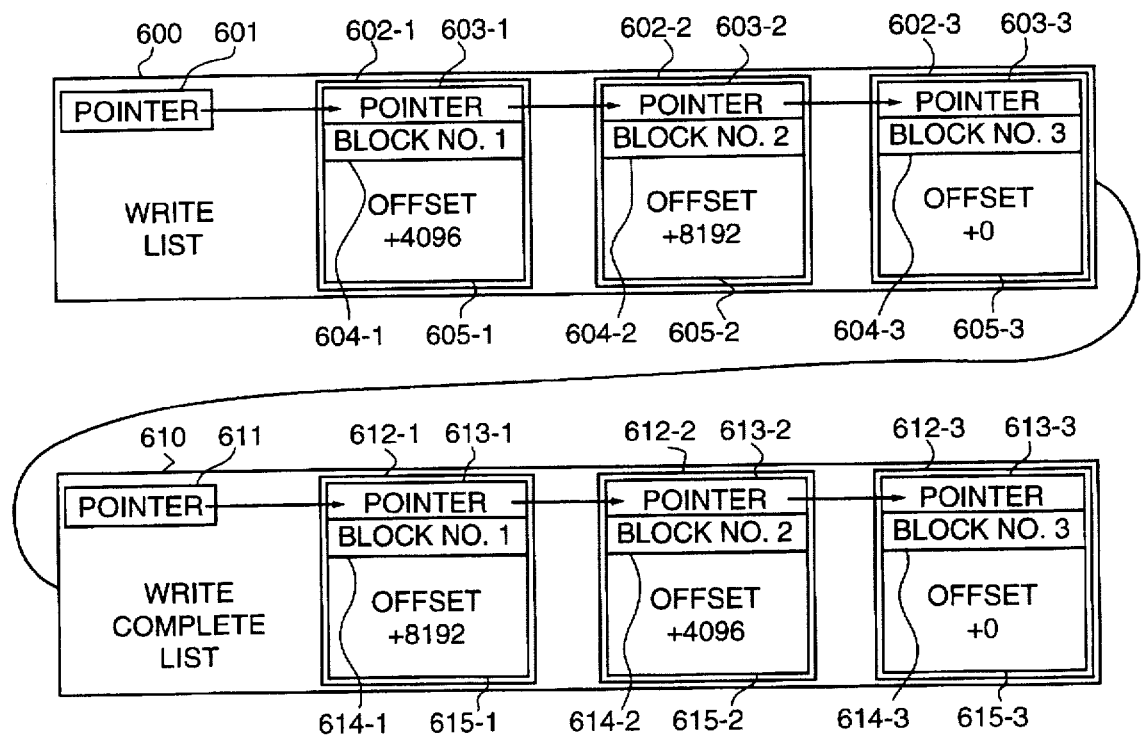
FIG. 8 is a block diagram of the control table of the file reception program of FIG. 1.

In FIG. 11, the write-complete list rearrange process (251) rearranges the write-complete list entry 612-1–612-3 so that the file offset values 614 of the write-complete list 610 shown in FIG. 8 are arranged in ascending order. The file displacement request process (252) calls the file displacement alteration process 350, rewrites the file displacement control table 620 of the reception file 61 in such a way that the physical block numbers 614-1–614-3 are rewritten to the values shown by the write-complete list entry 612-1–612-3 and returns to the file reception program 200.

The file displacement control table 630, after the process of altering the arrangement of the reception file 61, is as shown in FIG. 10. The plurality of block data (62-1)–(62-3) is in the physical block number storage areas 631-1–631-3, of physical block order numbers #3, #2, #1 in descending order.

The file displacement control table 630 is collectively altered after the file write process with the effect of reducing the number of times the file displacement alteration process 350 is called. However, the same effect may be achievable by calling the file displacement alteration process 350 each time the file write process is performed.

The file read/write process shows the file reading order decision process 110, the transmission data request process 130 and the reception data write request process.

FIG. 13 depicts the effect of the file read/write process. FIG. 13(a) shows a file displacement control table 640 for the read/write file, wherein block data 641-1–641-7 are continuously allocated in physical blocks #0–#6. The head positions of the physical blocks #0–#6 on an I/O unit 700 are shown in FIG. 13. Although a description has been given of a case where a disk having one head is used, the present invention is applicable to an I/O unit having a plurality of heads. In such an I/O unit, head-moving time is a delay in proportion to the distance between points before and after the movement of the head. I/O head-moving time in the file read/write of FIG. 13(c) amounts to 21 time units as the head is moved in the order of 713, 714, 712, 715, 711, 716, 710. Moreover, head-moving time using DISKSORT amounts to 17 time units as the head is moved in the order of 713, 714, 715, 712, 711, 716, 710 in FIG. 13(d). Head-moving time according to the present invention amounts to 9 time units as the head is moved in the order of 713, 710, 711, 712, 713, 714, 715, 716 in FIG. 13 (e). According to the present invention, the head-moving time is reduced to substantially ½ the head-moving time where DISKSORT is employed.

The present invention is applicable to not only file transfer between the computing systems as shown, but also file transfer between different sequential access type auxiliary memories in the same computing system. In this case, use can be made of a program-to-program management unit instead of the communication management unit 310-1.

The operation of using the file transmission program to read a file by an OS at the transmitting end is effective in reading a plurality of block data to be transferred to the main memory of the computing system at the transmitting end.

The order of data to be read in the file transmission program is determined on the basis of the physical positional relations of the group of physical data blocks holding the group of block data to be read. However, the order may be output beforehand as sorted when these areas are detected in the OS file management unit. In this case, it is unnecessary to determine the access order of the data areas by the file transmission program. Therefore, the order registered in the displacement table instructed by the OS may be used. This also applies to a case where the access order of the physical data blocks is determined by the file reception program.

The present embodiment may be so modified that the order of data to be read in the file transmission program or the order of the data area group to be accessed is determined by an OS on the transmission or reception side.

While a preferred embodiment of the present invention has been described in detail, with variations and modifications, further embodiments, variations and modifications are contemplated within the broader aspects of the present invention, in addition to the advantageous details, in accordance with the spirit and scope of the following claims.

We claim:

1. A process of transferring requested data from a file, held in a first physical order in a first sequential access type auxiliary memory contained in a first computing system and formed of block data arranged in a logical order, to a second sequential access type auxiliary memory, the process comprising the steps of:

detecting physical positions of a group of the block data that includes the requested data;

determining a read order of the group of block data on the basis of the physical positions to obtain a read time that is less than a read time using the logical order;

reading the group of block data sequentially from the first sequential access type auxiliary memory in the read order;

selecting a group of data blocks of a size to hold the group of block data, from among data blocks in the second sequential access type auxiliary memory;

determining a write order of the group of data blocks on the basis of physical positional relations of the group of data blocks; and writing the group of block data in the read order to the group of data blocks in the write order.

2. A process of transferring a file as claimed in claim 1, further including:

sequentially transferring in the read order the group of block data together with first logical identification data from the first computing system to a second computing system having the second sequential access type auxiliary memory.

3. A process of transferring a file as claimed in claim 2, wherein said writing step sequentially writes the group of block data together with corresponding ones of the first logical identification data to the group of data blocks.

4. A process of transferring a file as claimed in claim 2, further including the steps of:

prior to said step of writing, allocating temporary second logical identification data to the group of data blocks in the write order;

wherein said step of writing includes issuing a plurality of write requests designating the group of block data in the read order, and writing block data designated by each write request in response to each of the plurality of write requests; and replacing the second logical identification data with the first logical information data.

5. A process of transferring a file as claimed in claim 2, wherein said writing step is started before the second computing system completes reception of all transferred block data, so that said steps of transferring and writing are conducted in parallel.

6. A process of transferring a file as claimed in claim 4, wherein said writing step is started before the second computing system completes reception of all transferred block data.

7. A process of transferring a file as claimed in claim 2, further comprising the steps of notifying the second computing system from the first computing system of the total number of block data in the group of data blocks to be transferred before a start of said transferring step; and wherein said selecting step is conducted prior to said writing step and prior to completing said transferring step, in response to said notifying step so that the plurality of data blocks in the second auxiliary memory are equal to the total number of data blocks thus notified.

8. A process of transferring a file as claimed in claim 3, further including the steps of:

prior to said step of writing, allocating temporary second logical identification data to the group of data blocks in the write order;

wherein said step of writing includes issuing a plurality of write requests designating the group of block data in the read order, and writing block data designated by each write request in response to each of the plurality of write requests; and replacing the second logical identification data with the first logical information data.

9. A process of transferring a file as claimed in claim 8, wherein said writing step is started before the second computing system completes reception of all transferred block data, so that said steps of transferring and writing are conducted in parallel.

10. A process of transferring a file as claimed in claim 9, further comprising the steps of notifying the second computing system from the first computing system of the total number of block data in the group of data blocks to be transferred before a start of said transferring step; and wherein said selecting step is conducted prior to said writing step and prior to completing said transferring step, in response to said notifying step so that the plurality of data blocks in the second auxiliary memory are equal to the total number of data blocks thus notified.

11. A process of transferring a file formed of a group of block data, comprising:

detecting physical positional relationships of a first group of physical data areas holding the group of block data arranged in a logical order in a first sequential access auxiliary memory by a first file transfer program running in a first computing system;

determining a read order of the group of block data on the basis of the physical positional relationships by the first file transfer program in such a manner as to reduce read time;

sequentially in the read order, issuing from the first file transfer program a plurality of read requests, each designating one block data out of the group of block data and logical identification data so that the group of block data may be read out of the first sequential access auxiliary memory in the read order;

under control of a first operating system being run in the first computing system, sequentially executing the read requests in the read order to control reading the block data from the first auxiliary memory;

transferring the group of block data together with the logical identification data sequentially from the first computing system to a second computing system in the read order;

writing the block data sequentially to a second group of physical data areas in a second sequential access auxiliary memory in the second computing system; and storing the logical identification data together with the block data to the second sequential access auxiliary memory.

12. A process of transferring a file as claimed in claim 11, further comprising the steps of:

during said transferring step, running a second file transfer program in the second computing system to initiate a second operating system running in the second computing system for selecting the second group of physical data areas of a size to hold the group of block data;

during said transferring step, determining a write order on the basis of physical positional relationships of the second group of physical data areas by the second file transfer program in such a manner as to reduce write time required;

temporarily allocating a group of temporary logical identification data arranged in the write order for identifying block data to be held in the second group of physical data areas;

notifying the second file transfer program of the second group of physical data areas from the second operating system;

sequentially issuing in the read order from the second file transfer program a plurality of write requests for designating the block data and temporary logical identification data; and executing the write requests under the control of the second operating system.

13. A process of transferring a file as claimed in claim 12, wherein the step of storing the logical identification data includes allocating the logical identification data transferred from the first computing system to each one of the group of physical data areas in place of the temporary logical identification data.

14. A process of transferring a file as claimed in claim 11, wherein the step of detecting includes inquiring of the first operating system about the first group of data areas by the first file transfer program in response to a file transfer request.

15. A process of writing data as a group of block data, which constitute a file and are arranged in a logical order, to a sequential access type auxiliary memory contained in a computing system in a different order from the logical order, comprising the steps of:

from an application program running in the computing system, requesting an operating system running in the computing system to control reading and writing of data from and to the auxiliary memory to select a plurality of physical data areas necessary for storing the group of block data in the auxiliary memory;

selecting the group of physical data areas by the operating system;

notifying the application program of the group of physical data areas from the operating system;

temporarily allocating a group of temporary logical identification data for relatively identifying a group of data blocks to be held in the group of physical data areas;

determining a write order of the group of physical data areas on the basis of physical positional relationships of the group of physical data areas by the application program in such a manner as to reduce time required to write the block data to the group of physical data areas;

sequentially issuing from the application program a plurality of write requests designating the physical data areas in the write order, each including the temporary logical identification data and one block data;

writing the block data designated by the write requests under the control of the operating system to the group of physical data areas to which the temporary logical identification data designated by the write requests has been allocated; and allocating logical identification data according to the logical order of the group of block data to each of the group of physical data areas by the operating system in place of the temporary logical identification data.

16. A process of parallel accessing block data, which belong to different files held in a sequential access type auxiliary memory in a computing system, from a plurality of application programs running in the computing system, the process comprising the steps of:

issuing from each of the plurality of application programs data access requests in parallel, each including logical identification data of the block data to be accessed in the auxiliary memory;

holding in a queue at least one unexecuted data access request that has been issued from each application program;

detecting physical data blocks in the auxiliary memory logically corresponding to the queued data access requests;

determining an access order to the physical data blocks on the basis of positions of the physical data blocks and of read heads relative to the physical data blocks in such a manner as to reduce access time from a time that would be required to access in order the logical identification data;

executing the queued data access requests according to the access order so as to access the physical data blocks; and repeating the above detecting, determining and executing steps.

17. A process of gaining access to data as claimed in claim 16, wherein the above holding, detecting, determining and executing steps are carried out by an operating system for reading or writing of data from or to the auxiliary memory.

18. A process of transferring a file as claimed in claim 17, wherein said detecting step includes one of the application programs inquiring of the operating system about the group of data areas.

19. A process of transferring requested data from a file, held in a first physical order in a first sequential access type auxiliary memory contained in a first computing system and formed of block data arranged in a logical order, to a second sequential access type auxiliary memory, the process comprising the steps of:

detecting physical positions of a group of the block data that includes the requested data;

determining a read order of the group of block data on the basis of the physical positions to obtain a read time that is less than a read time using the logical order;

reading the group of block data sequentially from the first sequential access type auxiliary memory in the read order;

selecting a group of data blocks of a size to hold the group of block data, from among data blocks in the second sequential access type auxiliary memory; and writing the group of block data in the read order to the group of data blocks.

20. A process of transferring a file as claimed in claim 19, further including the steps of:

sequentially transferring in the read order the group of block data together with first logical identification data from the first computing system to a second computing system having the second sequential access type; and wherein said writing step sequentially writes the group of block data together with corresponding ones of the first logical identification data to the group of data blocks.

21. A process of transferring a file as claimed in claim 9, further including the steps of:

prior to said step of writing, allocating temporary second logical identification data to the group of data blocks in a write order;

wherein said step of writing includes issuing a plurality of write requests designating the group of block data in the read order in sequence, and writing block data designated by each write request to the data blocks in the write order in response to each of the plurality of write requests; and replacing the second logical identification data with first logical information data.

22. A process of transferring a file as claimed in claim 20, wherein said writing step is started before the second computing system completes reception of all transferred block data, so that said steps of transferring and writing are conducted in parallel.

23. A process of transferring a file as claimed in claim 20, further comprising the steps of notifying the second computing system from the first computing system of the total number of block data in the group of data blocks to be transferred before a start of said transferring step; and wherein said selecting step is conducted prior to said writing step and prior to completing said transferring step, in response to said notifying step so that the plurality of data blocks in the second sequential access type auxiliary memory are equal to the total number of data blocks thus notified.

24. A process of transferring a file as claimed in claim 23, wherein said writing step is started before the second computing system completes reception of all transferred block data, so that said steps of transferring and writing are conducted in parallel.

25. A process of transferring a file as claimed in claim 19, further comprising the steps of:

transferring the block data from a temporary memory under control of the first operating system to a temporary memory under control of the second operating system;

conducting said steps of detecting, determining and reading with the first operating system, and conducting said steps of selecting and writing with the second operating system in parallel with said transferring step;

notifying the second operating system from the first operating system of the total number of block data in the group of data blocks before a start of said transferring step; and wherein said selecting step is conducted prior to said writing step and prior to completing said transferring step, in response to said notifying step so that the plurality of data blocks in the second sequential access type auxiliary memory are equal to the total number of data blocks thus notified.

26. A process of writing data as a group of block data which constitute a file to a sequential access type auxiliary memory contained in a computing system, comprising the steps performed by the computing system of:

receiving in the computing system information of an amount of block data in the group of block data to be received;

thereafter selecting a plurality of physical data areas necessary for storing the group of block data in the auxiliary memory on the basis of the amount;

temporarily allocating a group of temporary logical identification data for relatively identifying a group of data blocks to be held in the group of physical data areas;

determining a write order of the group of physical data areas on the basis of physical positional relationships of the group of physical data areas in such a manner as to reduce time required to write the block data to the group of physical data areas;

sequentially issuing from the application program a plurality of write requests designating the physical data areas in the write order, each including the temporary logical identification data and one block data;

receiving some of the block data one of before and after said selecting, allocating, determining and issuing step;

writing the some of the block data designated by the write requests under the control of the operating system to the group of physical data areas to which the temporary logical identification data designated by the write requests has been allocated;

receiving a remainder of the block data one of before and after said selecting, allocating, determining and issuing step;

writing a remainder of the block data designated by the write requests under the control of the operating system to the group of physical data areas to which the temporary logical identification data designated by the write requests has been allocated; and allocating logical identification data according to the logical order of the group of block data to each of the group of physical data areas by the operating system in place of the temporary logical identification data.

* * * * *